Aug. 7, 1951  W. R. WINSLOW  2,563,298
STABILIZING SURFACE FOR AIRCRAFT
Filed April 1, 1947  9 Sheets-Sheet 1

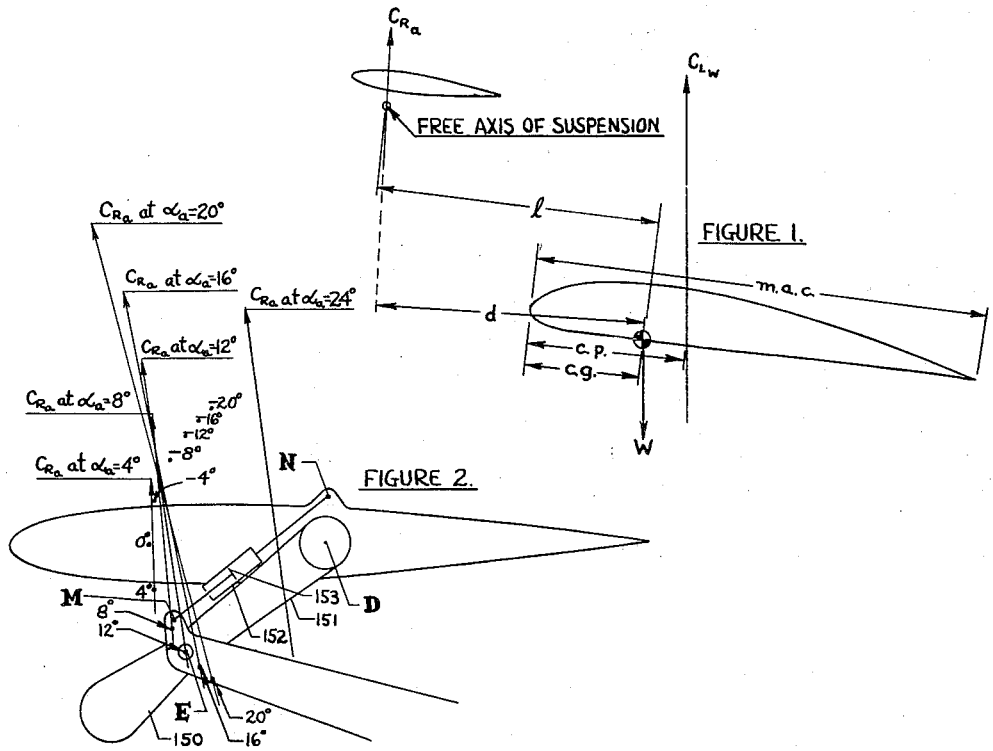

FIGURE 3.

| CONDITION OF FLIGHT | $\alpha_w$ | $C_{L_w}$ | c.p. | $C_{M_{ac}}$ | $\alpha_a$ | $C_{R_a}$ | $d/mac$ |
|---|---|---|---|---|---|---|---|
| AT $\alpha_w$ HIGHER THAN THE $\alpha_w$ FOR EQUILIBRIUM | 16° | 1.53 | .31 | -.08 | 12° | .90 | .7 |
| AT $\alpha_w$ LOWER THAN THE $\alpha_w$ FOR EQUILIBRIUM | 4° | .69 | .36 | -.08 | 12° | .90 | .8 |

ASSUMED DESIGN PROPORTIONS:  $\frac{S_a}{S_w} = \frac{1}{4}$ ; $mac = 1$ ; $\frac{\ell}{mac} = .8$ ; c.g. $= .25$

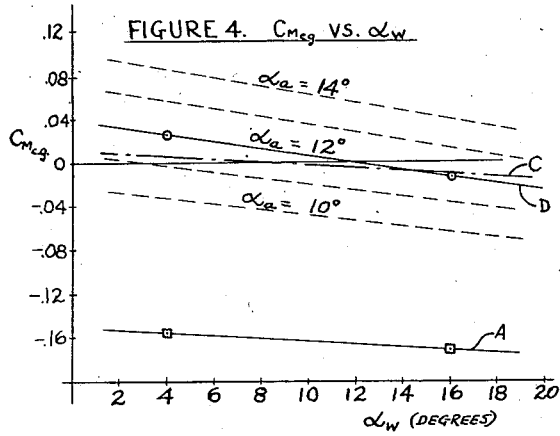

William R. Winslow INVENTOR.

BY Philip S. McLean
Atty.

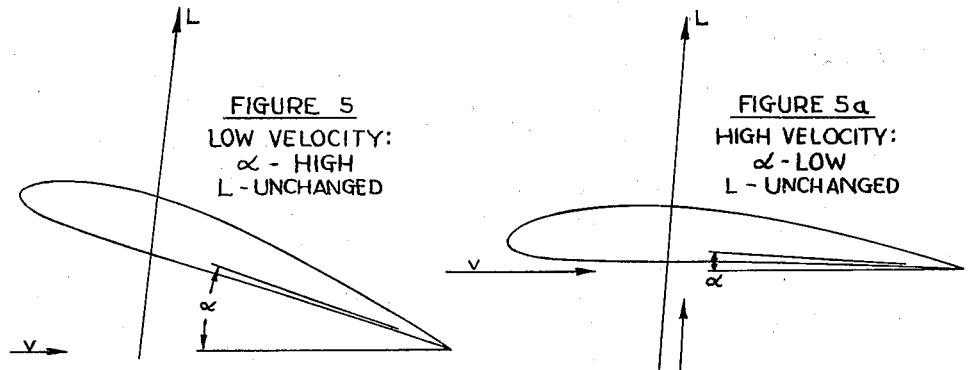
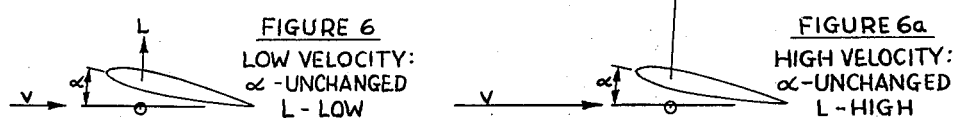
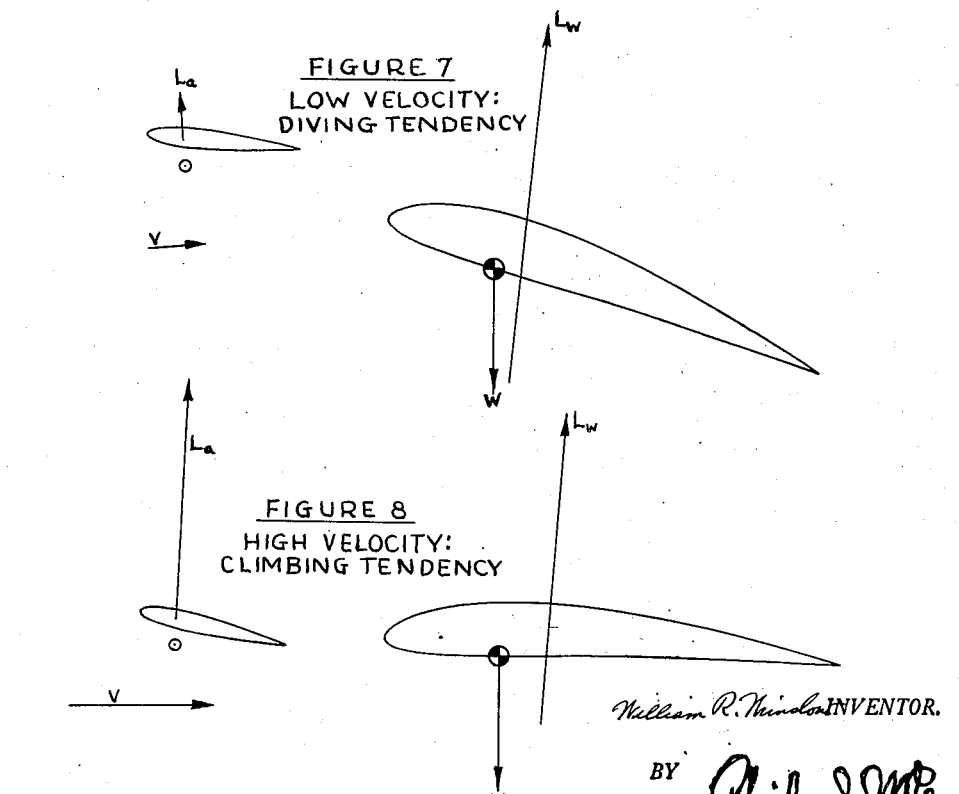

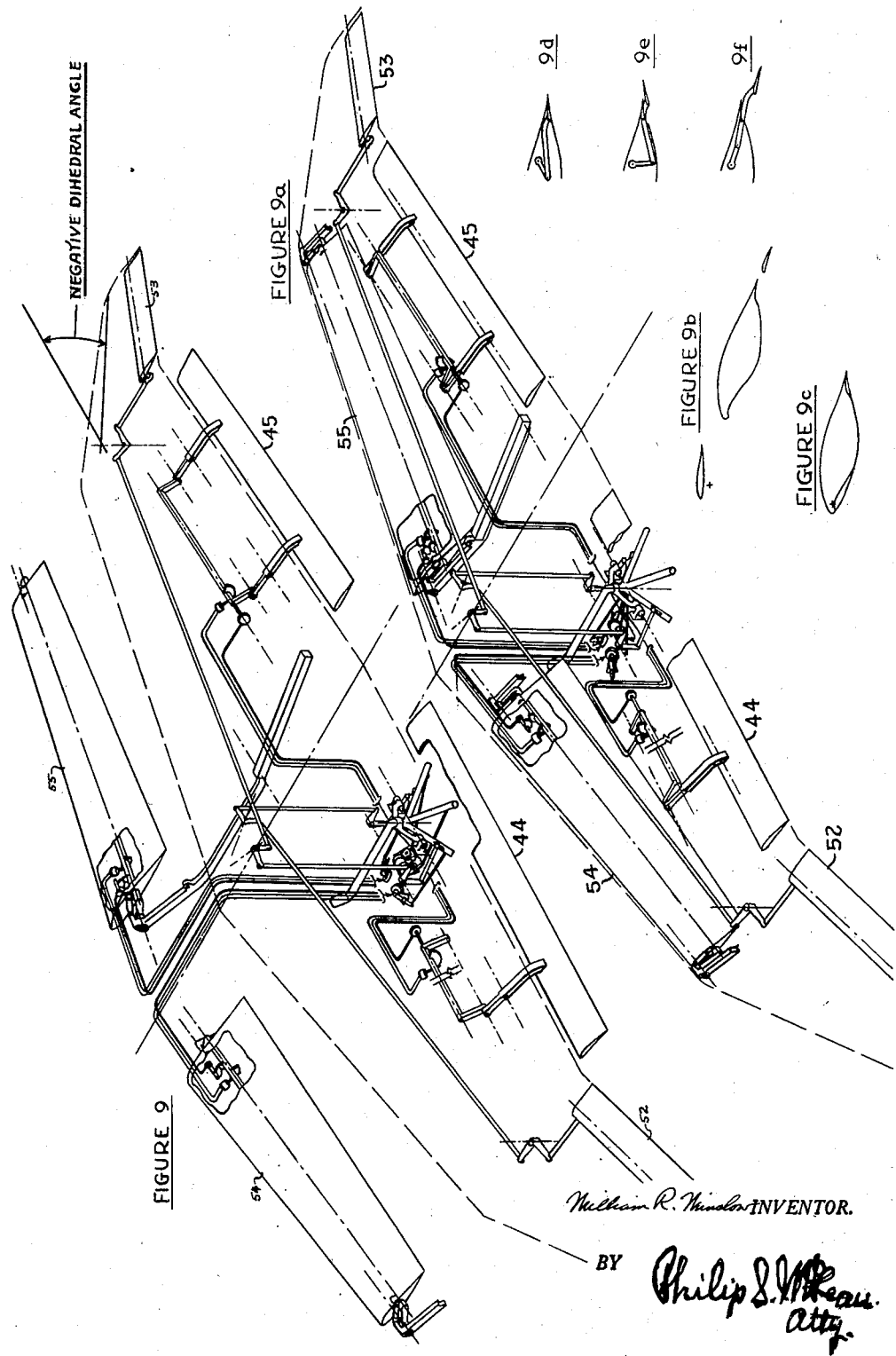

Aug. 7, 1951 W. R. WINSLOW 2,563,298
STABILIZING SURFACE FOR AIRCRAFT
Filed April 1, 1947 9 Sheets-Sheet 4
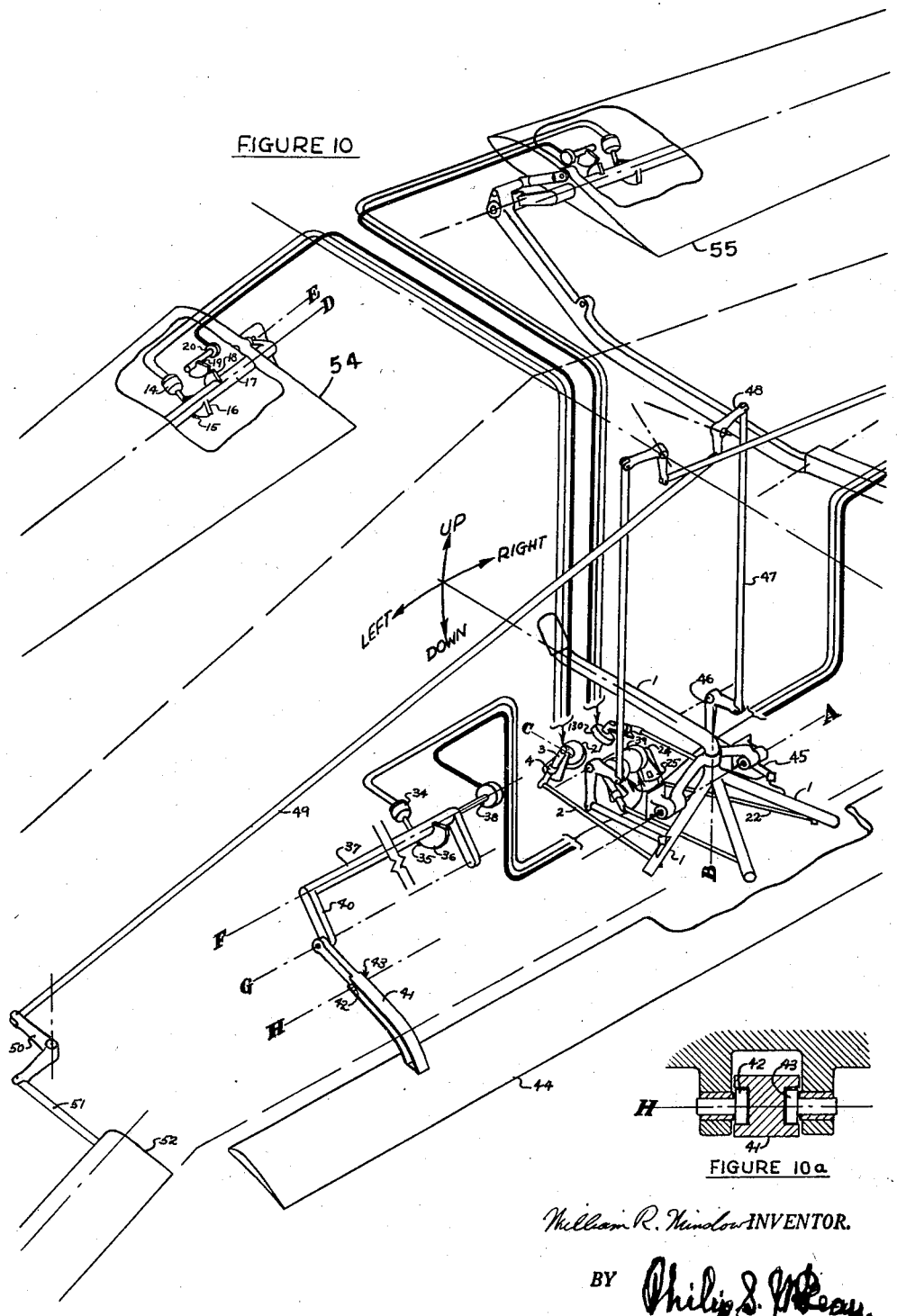

Aug. 7, 1951     W. R. WINSLOW     2,563,298
STABILIZING SURFACE FOR AIRCRAFT
Filed April 1, 1947     9 Sheets-Sheet 5
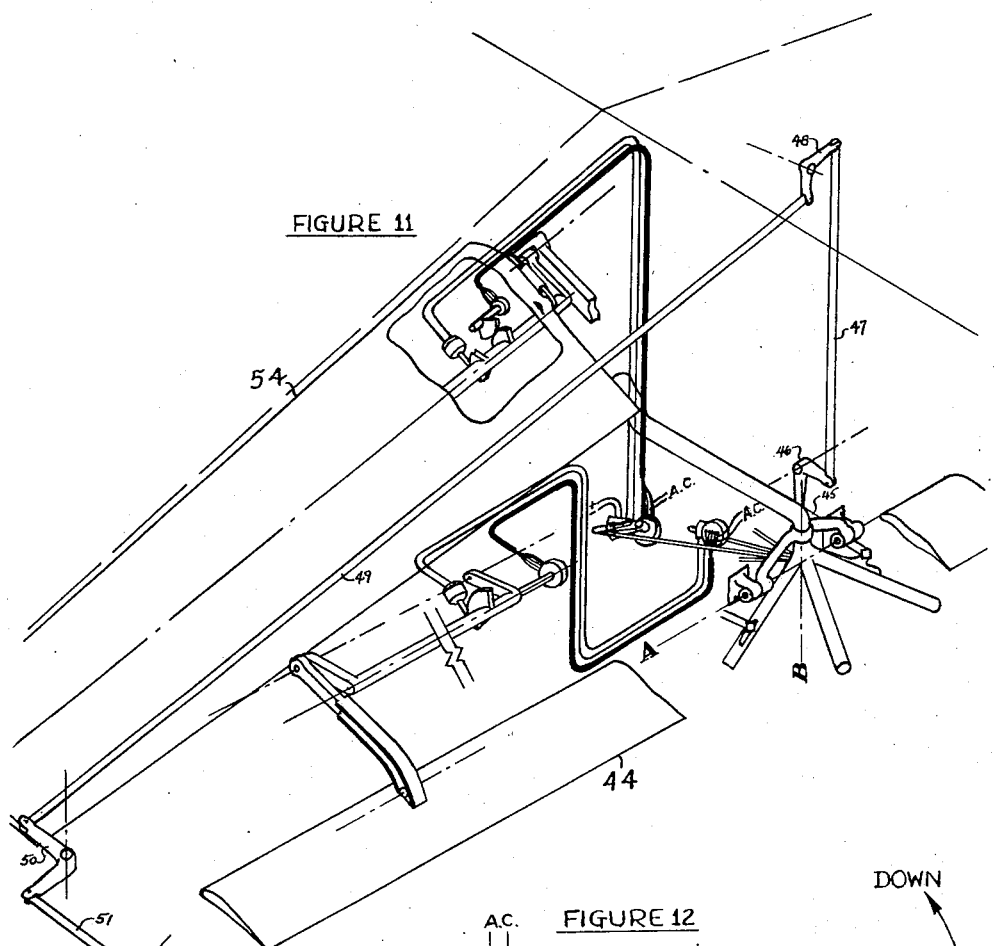
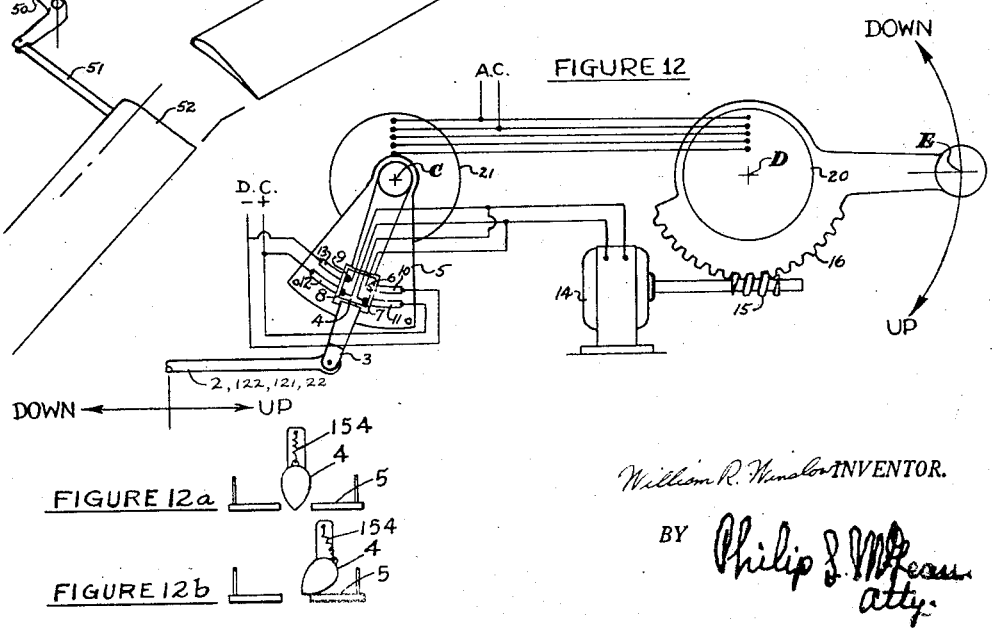

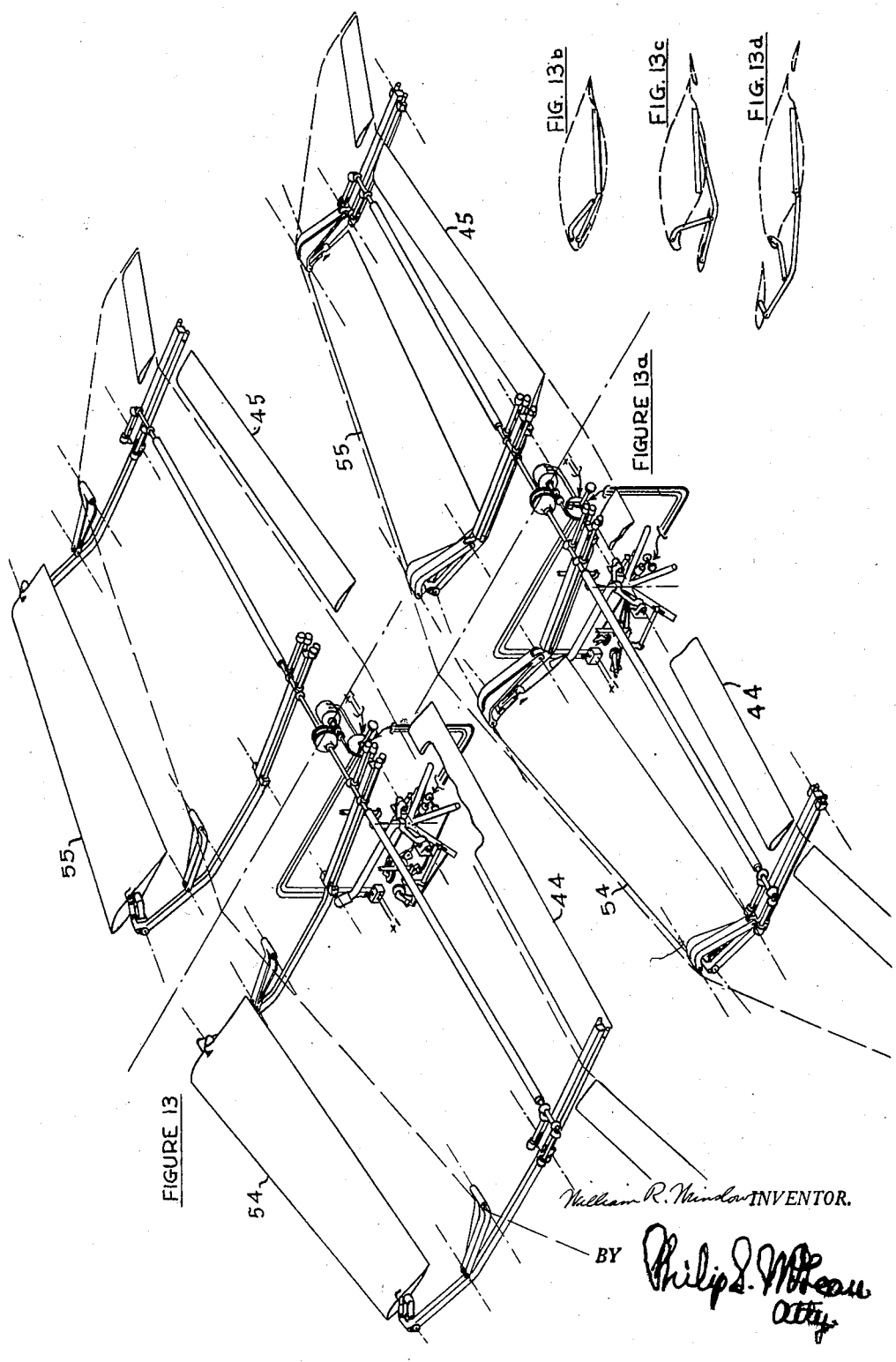

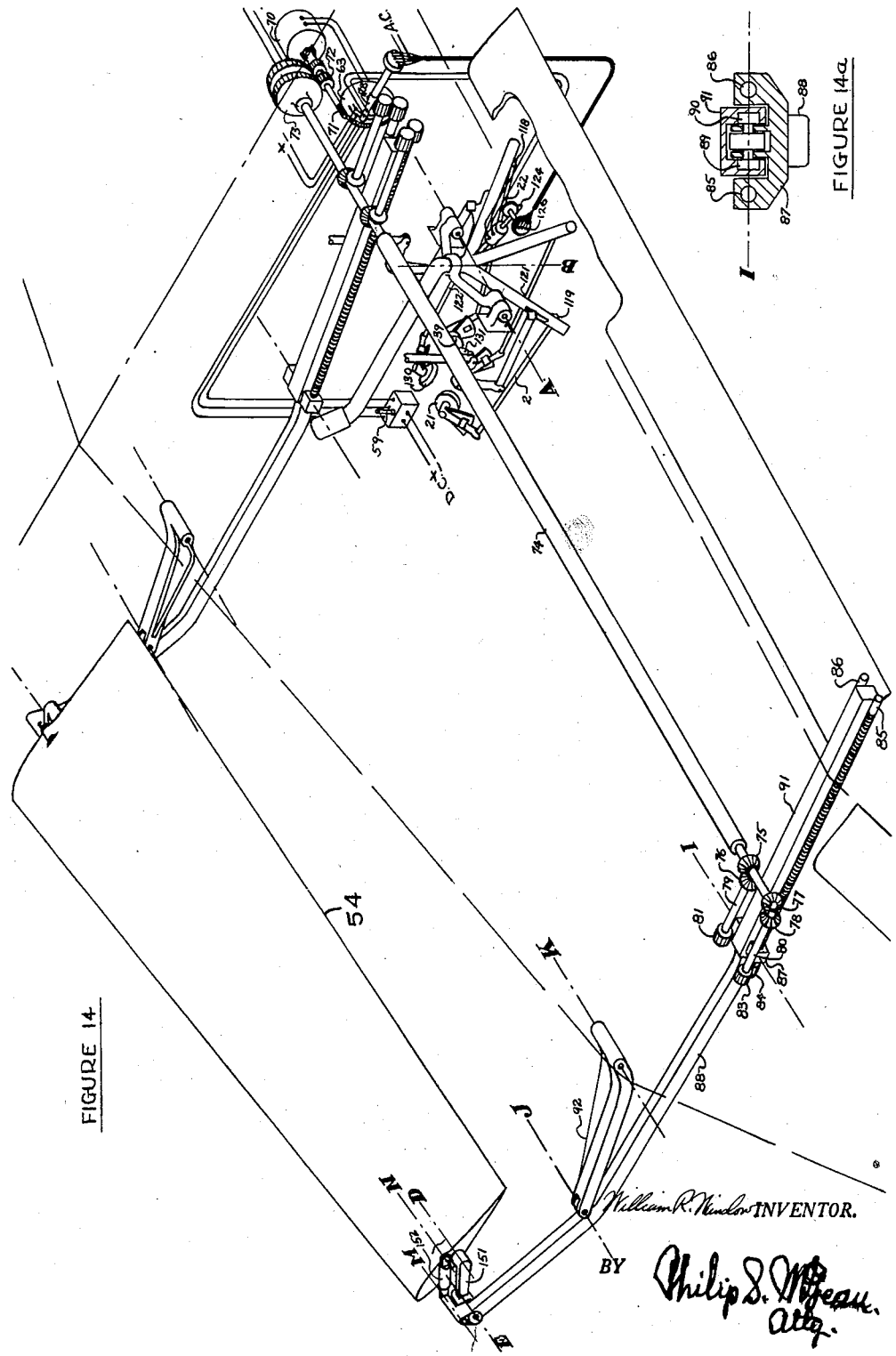

Aug. 7, 1951 W. R. WINSLOW 2,563,298
STABILIZING SURFACE FOR AIRCRAFT
Filed April 1, 1947 9 Sheets-Sheet 8
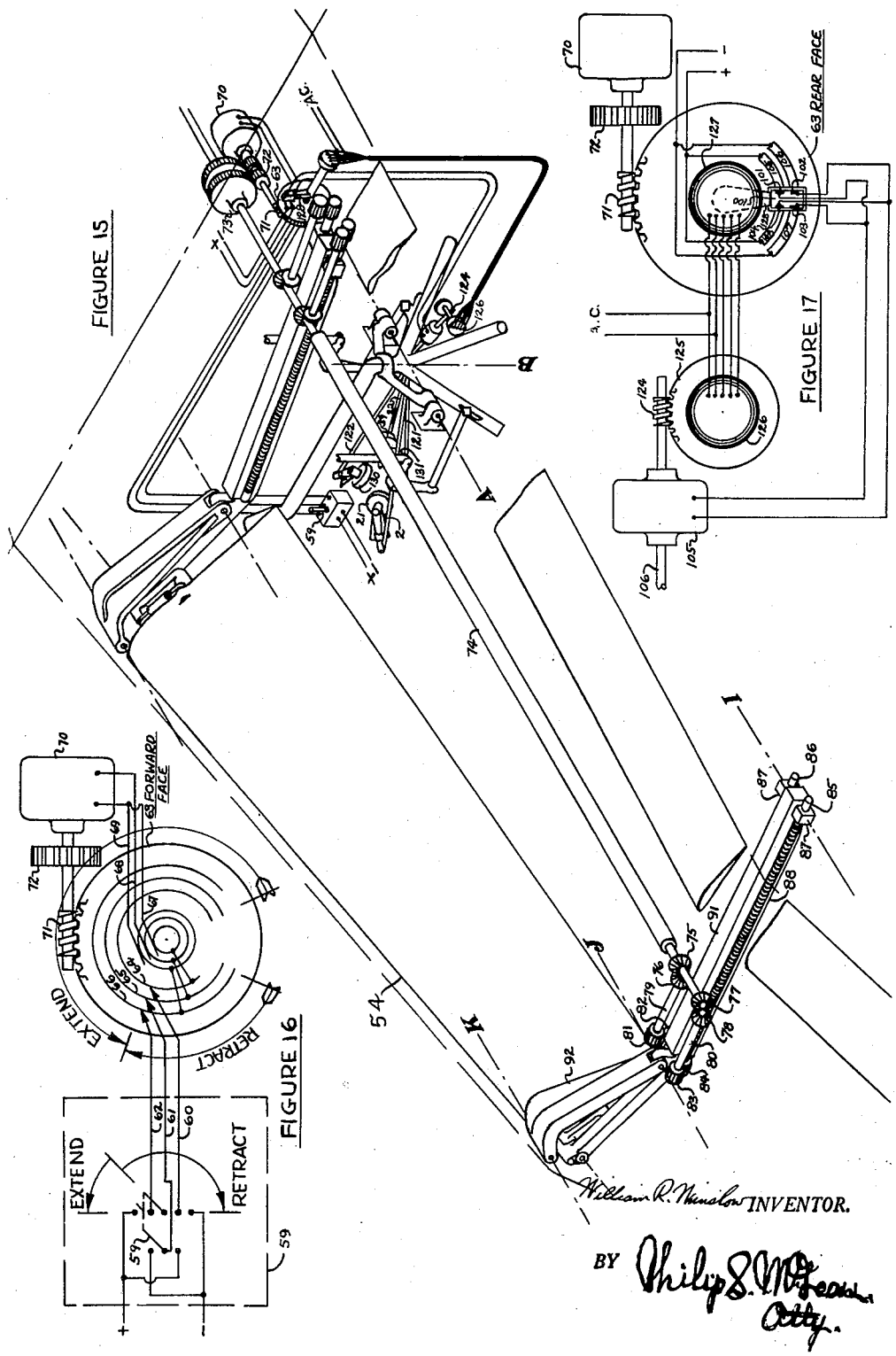

Aug. 7, 1951  W. R. WINSLOW  2,563,298
STABILIZING SURFACE FOR AIRCRAFT
Filed April 1, 1947  9 Sheets-Sheet 9
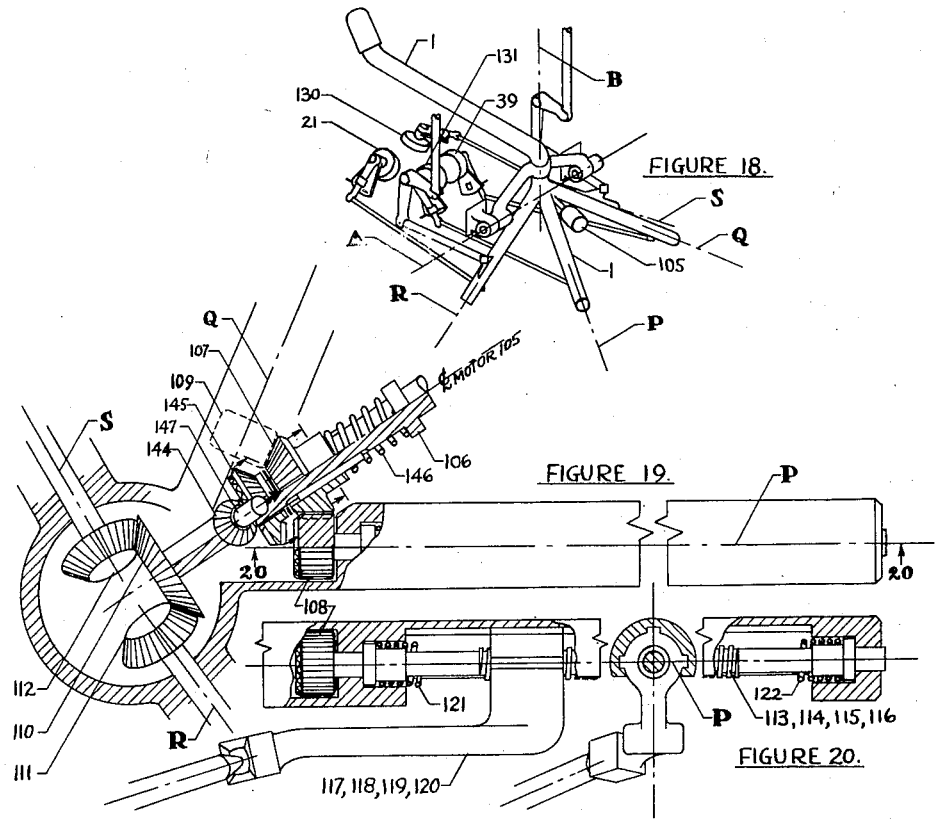
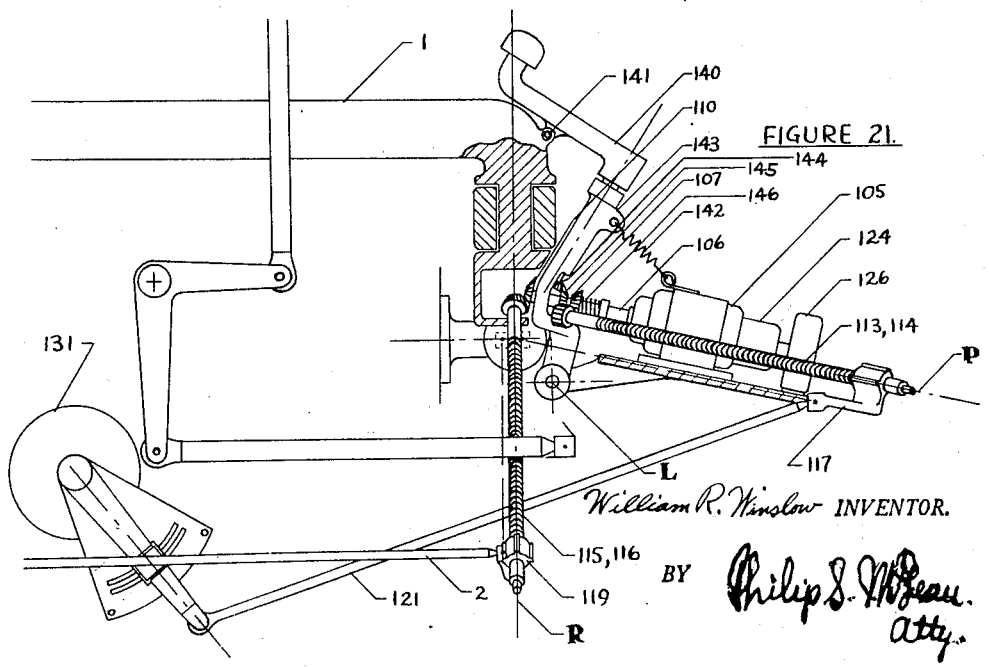
William R. Winslow INVENTOR.

UNITED STATES PATENT OFFICE 2,563,298

STABILIZING SURFACE FOR AIRCRAFT

William R. Winslow, North Tonawanda, N. Y.

Application April 1, 1947, Serial No. 738,642

5 Claims. (Cl. 244—75)

I. OBJECTS AND GENERAL DEFINITION OF THE INVENTION 1. (a) The invention herein described has for its object an aircraft embodying a new and unique system of stability and control.

This aircraft is composed primarily of a wing and fuselage combination having a low degree of stability or instability, and attached to and ahead of said wing, an airfoil suspended by a certain means which causes it to possess a floating action in the airstream.

This floating action is a hitherto known action characteristic of any object, presumably an airfoil, suspended in the airstream by means of a spanwise axis about which there is allowed free rotation. By virtue of this free rotation, the angle of attack of the airfoil remains substantially constant throughout a change in the speed and direction of the airstream.

The term "wing" as it is used herein is construed to mean one or more airfoils held in fixed or controlled relationship to one another. It is further construed that the wing is a part of the main body of the aircraft, to which fuselages, power plants, landing gears, etc. might normally be attached.

When used in combination with the floating airfoil, the wing itself, as defined above, possesses a low degree of stability or instability.

In any other known design embodying a floating auxiliary airfoil, the floating airfoil at a given substantially constant angle of attack imparts to the aircraft a pitching tendency of a constant magnitude throughout a change in the main wing's angle of attack. As illustrated in Fig. 4, an aircraft having a pitching tendency versus angle of attack as indicated by curve A is effected by this added constant pitching tendency in such a way as to result in a pitching tendency for the complete aircraft as indicated by curve C. It is to be noted that the slope of curve C is the same as the slope of curve A. The static stability is not changed by the addition of the auxiliary airfoil.

The proposed floating airfoil, however, by virtue of its free pivotal attachment and the location of said pivotal attachment in relation to the aircraft center of gravity imparts to the aircraft a stable pitching tendency which varies inversely with the angle of attack of the main wing. As indicated by curve D in Fig. 4, this results in a more stable slope of the complete aircraft's $dC_{m_{C.G.}}/d\alpha$ relation. The broken line curves in Fig. 4 indicate the $dC_{m_{C.G.}}/d\alpha$ relation for various degrees of longitudinal control, i. e. auxiliary airfoil angles of attack.

Furthermore, the pitching tendency at various controlled angles of attack of the auxiliary airfoil imparts a greater stabilizing tendency to the aircraft for higher angles of attack of the auxiliary airfoil. This results in a somewhat greater contribution to static stability at reduced speeds and a smaller contribution to static stability at increased speeds. Referring to Fig. 4, this effect is illustrated by the greater slope of the $\alpha_a=14°$ curve for slower equilibrium flight and the smaller slope of the $\alpha_a=10°$ curve for faster equilibrium flight.

It is seen to be a necessary requirement of stable flight in other known designs embodying floating auxiliary airfoils for longitudinal control that the aircraft exclusive of its auxiliary airfoil be possessed of a stable tendency. In the proposed aircraft, a stable tendency of the aircraft exclusive of its auxiliary airfoil, although usually desirable, is not necessary for stability of the complete aircraft. This characteristic further distinguishes this aircraft from other known designs.

The action of the auxiliary or floating airfoil in conjunction with the unstable wing in free flight is such as to produce inherent stability for the combination of said airfoil and wing.

(b) The invention herein described further embodies a mechanical means of regulating the aerodynamic force on the auxiliary control airfoil. The free spanwise axis, about which the control airfoil is suspended, has a movable location relative to the airfoil. This relative location is controllable by the pilot. The designed purpose of this movable relative location is one of enabling the airfoil to be regulated to a variety of angles of attack, such regulation being controllable by the pilot in flight. Each location of the free axis relative to the airfoil causes the airfoil to assume a certain characteristic angle of attack. This characteristic angle of attack will, by virtue of the floating action, remain substantially constant in flight and will change only with a controlled change in the said relative location of the free axis.

(c) The invention herein described has as a further object a means by which the auxiliary airfoils may be manipulated in flight by the pilot, thereby to control the attitude of the aircraft in pitch and roll.

(d) A further object of this invention embodies a feature by which the auxiliary control airfoils may be retracted into the underside of the wing. In their retracted positions, the control airfoils contribute to the shape of, and become a part of the airfoil of the wing.

(e) A further object of this invention embodies a retracting mechanism which during the extension-retraction motion produces the following conditions relative to the action of the control system: (1) As the control airfoils are near their retracted positions, the aerodynamic forces on the control airfoils are such as to cause the control airfoils to trail in the airstream in a weather-vane fashion with small downward (away from the wing) aerodynamic forces. At this position of the control airfoils, the pilot's control action at the control stick imparts only a very small degree of control action to the airfoils, and zero control action to the airfoils when they are at their fully retracted positions. (2) As the control airfoils move forward from their retracted positions toward their extended positions, an automatic action which is independent of the pilot's control action causes the above described relative location of the free axis to change in a way as to bring about additional lifting force. This additional lifting force increases in magnitude with extension motion and reaches a desirable positive magnitude at full extension. (3) The effectiveness of the control stick action in producing control action at the control airfoils increases from a zero degree at their retracted positions to a maximum degree at their fully extended positions.

The above involves an auxiliary airfoil designed to travel from the retracted position within the airfoil shape of the wing to an extended position ahead of the wing, and also in a reverse manner back to the retracted position. Accompanying and coordinated with this retracting action there is a further action, referred to in the following paragraph.

(f) A further object of the invention embodies two trailing airfoils which are a part of the main wing of the aircraft and which are located below and to the rear of its trailing edge. In addition to contributing to the lift, the trailing airfoils contribute largely to the instability of the main wing, which must be overcome by the stabilizing action of the leading control airfoils. The trailing airfoils are designed to be retractable into the airfoil shape of the wing, thereby to discontinue the main wing's unstable tendency. Also, lift and drag are reduced by the retraction of the trailing airfoils. This retraction takes place during the retraction of the leading control airfoils. The positive moment produced by the leading control airfoils and the negative moment of the trailing control airfoils are designed approximately to nullify one another both during their coordinated extension-retraction motion and at their fully extended positions. As is characteristic of the mechanical action of the leading control mechanism during extension-retraction, the control stick action in producing action at the trailing control airfoils also increases in effectiveness as the airfoils move toward their extended position. This effectiveness to the motion of the control stick increases from zero at the fully retracted position of the trailing airfoils to a maximum at their fully extended positions. Both the variation in effectiveness to the motion of the control stick and the variation in the lift and moment producing aerodynamic forces (at both leading and trailing control airfoils) are mechanically linked with the extension-retraction motion of the leading control airfoils, and are independent of the action of the control stick.

(g) A further object of the invention is a means for vertically trimming the aircraft in flight.

(h) A further object of the invention embodies a device for limiting the variation in the angle of incidence between the leading control airfoil and the longitudinal axis of the main wing. As explained above, this angle of incidence varies in flight as the airfoil "floats" on the direction of the air in its vicinity. The object of this limiting device is to prevent the airfoil from falling in a pendulum manner due to its weight, and assuming an abnormal flight angle of incidence when the aircraft is travelling at less than its normal flight airspeed.

(i) A further object of this invention embodies a static balance (substantially as indicated by part 150 in Fig. 2, located along the axis of arm 151) and on the side of the free axis of suspension which causes it to counter-balance the weight of the auxiliary wing, thus serving to nullify the effect of its weight.

(j) A further object embodies a device (substantially as indicated by part 152 in Fig. 14) for damping rapid angular motion about the free axis of suspension.

2. The following is a list of intended advantages claimed in general for an aircraft design embodying the invention:

(a) With the auxiliary airfoils in extended positions:

1. Additional lifting surface wing area, of advantage in flying at low speed flight;

2. Employment of a wing airfoil shape that is conducive of a high lift coefficient, of advantage in low speed flight;

3. Employment of a fixed slot of highly effective design;

4. Additional control surface area with resulting additional control effectiveness, of advantage in low speed flight;

5. Aerodynamic effectiveness of design wherein all aerodynamic surfaces contribute to the total lift.

6. The feature of positive control action wherein the main control forces which are located at the leading control airfoils act positively in the direction of the desired control;

7. An optional safety feature, depending on an appropriate aircraft design, whereby a stall on the main lifting surface is prevented by an earlier partial stall on the auxiliary airfoil.

8. If the invention is used in conjunction with an aircraft designed to hover in a vertical attitude, the arrangement of the control surfaces directly behind the plane of the rotor affords a condition of better aerodynamic control at zero aircraft speed. Also, in this type of design, the elimination of tail surfaces and sweep back in the wing design affords an advantageous condition for the design of a vertical attitude type landing gear (such as illustrated in Fig. 20).

9. A safety feature embodying a stall warning manifested by a characteristic oscillating motion of the auxiliary airfoil about its axis of suspension as it approaches a stall.

(b) With auxiliary airfoils retracted:

1. Low wing area, desirable for high speed flight;

2. Employment of a nearly symmetrical wing airfoil shape conducive of low drag and of an advantageous aerodynamic pressure distribution at high speed;

3. Diminished control sensitivity, desirable in high speed flight;

4. Aerodynamic cleanness of design, afforded by the elimination of all aerodynamic surfaces extraneous to the wing.

In the drawings accompanying and forming part of this disclosure—

Fig. 1 is a diagram of the main airfoil and auxiliary airfoil showing the areodynamic force coefficients in their relative locations;

Fig. 2 is a diagram of the auxiliary airfoil and supporting structure showing the resultant force vector $C_{R_a}$ for ($a_a=12°$) and broken line vectors for ($a_a=8°$) and ($a_a=16°$).

Fig. 3 is a table of airfoil data and assumed proportions of design used in the stability calculations.

Fig. 4 is a plot of the aircraft pitching moment $C_{m_{C.G.}}$ versus the wing angle of attack ($a_w$) for (A) the main wing alone and (D) for the combined main wing and auxiliary wing.

Fig. 5 and Fig. 5a, respectively, show the effect of low and high velocity on angle of attack of an airfoil in free flight.

Fig. 6 and Fig. 6a, respectively, show the effect of low and high velocity on angle of attack of an airfoil suspended in flight by a spanwise axis about which there is allowed free rotation.

Fig. 7 is a diagram of the combination of an unstable wing and a freely suspended auxiliary airfoil, showing the effect on the pitching tendency brought about by an airspeed which is lower than the equilibrium air speed for the given angle of attack of the auxiliary airfoil.

Fig. 8 is a diagram of the combination of an unstable wing and a freely suspended auxiliary airfoil, showing the effect of the pitching tendency brought about by an airspeed which is higher than the equilibrium air speed for the given angle of attack of the auxiliary airfoil.

Fig. 9 is a diagram of the control system in the extended configuration of the retractable control surfaces.

Fig. 9a is a diagram of the control system in the retracted configuration of the control surfaces.

Fig. 9b is a diagram of the relative airfoil shapes of the auxiliary airfoil and the airfoils comprising the wing in the extended configuration.

Fig. 9c is a diagram of the relative shapes of the auxiliary airfoil and the airfoils comprising the wing in the retracted configuration.

Figs. 9d, 9e and 9f are diagrams of the relative positions of the primary mechanical parts which support the trailing airfoil of the wing showing, respectively, three positions: (d) fully retracted, (e) intermediate and (f) the neutral control position corresponding to the fully extended position of the auxiliary airfoil retracting mechanism.

Fig. 10 is a diagram showing the primary mechanical parts of the control system in the extended configuration.

Fig. 10a is a cross sectional diagram of beam 41 and rollers 42 and 43.

Fig. 11 is a diagram showing the primary mechanical parts of the control system in the retracted configuration.

Fig. 12 is a schematic diagram showing typical electrical wiring and mechanical parts for the transmission of motion between rods 2, 122, 121, 22, and their respective control surfaces.

Figs. 12a and b are auxiliary views of cam 4 and segment 5.

Fig. 13 is a diagram of the retracting mechanism of the auxiliary airfoils 54 and 55 in the extended configuration.

Fig. 13a is a diagram of the retracting mechanism of the auxiliary airfoils 54 and 55 in the retracted configuration.

Fig. 13b is a diagram showing the relative positions of the primary mechanical parts of the retracting mechanism in the retracted configuration of the auxiliary airfoil.

Fig. 13c is a diagram showing the relative positions of the primary mechanical parts of the retracting mechanism in an intermediate position between the retracted and extended configurations of the auxiliary airfoil.

Fig. 13d is a diagram showing the relative positions of the primary mechanical parts of the retracting mechanism in the extended configuration of the auxiliary airfoil.

Fig. 14 is a diagram showing the primary mechanical parts of the retracting mechanism in the extended configuration.

Fig. 14a is a detail cross section sketch of carriage 87, track 91 and rollers 89 and 90 at axis I.

Fig. 15 is a diagram showing the primary mechanical parts of the retracting mechanism in the retracted configuration.

Fig. 16 is a schematic diagram showing the electrical wiring and mechanical parts between the retracting control switch 59 and motor 70.

Fig. 17 is a schematic diagram showing the electrical wiring and mechanical parts for the transmission of motion between motor 70 and motor 105.

Fig. 18 is an isometric view of the cockpit control unit.

Fig. 19 is a detail view of the mechanism for coordinating the control action with the retracting action showing a cross-section in the plane of axes P and Q.

Fig. 20 is an auxiliary side view along the line 20—20 of Fig. 19 showing a mechanism at axes P, Q, R and S.

Fig. 21 is a side view as viewed from the left of the cockpit control unit with parts of frame 1 removed to show the working parts.

The invention will be best understood by first considering the aerodynamic theory upon which it is based, with particular respect to an analysis of stability.

II. ANALYSIS OF STABILITY

1. *Quantitative analysis of stability assuming constant velocity and zero acceleration*

Two airfoils of known aerodynamic characteristics are used in the following analysis. The two airfoils used are a U. S. A. 35B airfoil for the main wing and an N. A. C. A. 0012 airfoil for the auxiliary wing.

Abbreviations applying to Figs. 1 to 8:

M. A. C.—mean aerodynamic chord of wing.

$l$—longitudinal length between the aircraft center of gravity and the axis of suspension of the auxiliary airfoil.

$C_{R_a}$—resultant coefficient of lift and drag, auxiliary wing.

$C_{L_W}$—coefficient of lift, main wing.

C. G.—center of gravity location, measured from the leading edge of the wing, in percent of M. A. C.

C. P.—center of pressure location, measured from the leading edge of the wing, in per cent chord.

$C_{M_{ac}}$—moment coefficient about the aerodynamic center.

$d$—approximate distance in percent of M. A. C. from $C_{R_a}$ to the center of gravity.

$\rho$—air density.

$v$—air velocity.
$L_w$—lift of the main wing.
$L_a$—lift of the auxiliary airfoil.
$W$—weight of the aircraft.
$a_w$—angle of attack, main wing.
$a_a$—angle of attack, auxiliary wing.
$S_w$—planiform area of the main wing.
$S_a$—planiform area of the auxiliary wing.

Referring to Fig. 1, a summation of moments is taken about the aircraft center of gravity.

$$1. C_{m_{C.G.}} = C_{m_{A.C.}} - C_{L_w} (C.P. - C.G.) + (C_{R_a})(d/M.A.C.)(S_a/S_w)$$

An angle of attack is assumed for the auxiliary airfoil which, by virtue of its free span-wise axis of suspension, remains constant under conditions of varying wing angle of attack.

Two conditions of wing angle of attack are assumed, one higher and one lower than the angle of attack for equilibrium flight.

Referring to known airfoil characteristics, the values of $a_w$, $C_{L_w}$, C. P., $a_a$, $C_{R_a}$ and approximate $d/M.A.C.$ are compiled in Fig. 3.

Aircraft design proportion $S_a/S_w$ is assumed to be ¼. The center of gravity is assumed to be located at .25 M. A. C.

Solving Equation 1 for $C_{m_{C.G.}}$ at the condition of the higher $a_w$, $$C_{m_{C.G.}} = -.08 - 1.53(.31 - .25) + (.90)(.7)(¼)$$
$$C_{m_{C.G.}} = -.015$$

Solving Equation 1 for $C_{m_{C.G.}}$ at the condition of the lower $a_w$, $$C_{m_{C.G.}} = -.08 - .69(.36 - .25) + (.90)(.8)(¼)$$
$$C_{m_{C.G.}} = .024$$

The slope of the $C_{m_{C.G.}}$ curve thus obtained and illustrated by curve D in Fig. 4 indicates a stable tendency.

2. Qualitative analysis of static stability assuming free flight conditions

The foregoing explanation and determination of stability is founded on a basis of displacement of the wing angle of attack with airspeed assumed to remain constant.

Under actual conditions of free flight in smooth air, airspeed and altitude are added variables. A normally stable airplane disturbed from a condition of equilibrium will oscillate in a vertical plane with airspeed varying inversely with altitude, and with oscillations diminishing in magnitude until a condition of equilibrium is again reached. During such stable oscillations the angle of attack of the main wing varies inversely with the square of the velocity.

$$W - L = a\ constant = C_L ½ \rho S v^2$$

$$C_L = \frac{a\ constant}{v^2}$$

$$C_L \sim \alpha$$

Therefore $$\alpha \sim 1/v^2$$

The angle of attack of the auxiliary airfoil, freely suspended ahead of the wing, however, remains substantially the same throughout a variation in the speed and direction of the airstream.

In the following explanation it will be seen that changes in airspeed contribute a large degree toward the stability.

An increase in the airspeed is accompanied by a decrease in the wing angle of attack while the lift on the wing remains substantially the same. (See Figs. 5 and 5a.)

At the same time, on the auxiliary airfoil, this increase in airspeed brings about a pronounced increase in lift. (Figs. 6 and 6a.)

$$L = C_L ½ \rho S v^2$$

The angle of attack remaining unchanged and hence $C_L$ being constant, $$L \sim v^2$$

Fig. 7 illustrates the combined effect on pitching tendency of a decreased airspeed.

Fig. 8 illustrates the combined effect on pitching tendency of an increased airspeed.

Decreased airspeed as illustrated by Fig. 7 produces a diving tendency and thereby a gain in airspeed.

Increased airspeed as illustrated by Fig. 8 produces a climbing tendency and thereby a loss of airspeed.

A further effect which contributes toward stability, not mentioned heretofore, is the changing value of $L_w$ which can be seen below to decrease with an increase in $L_a$.

$$\Sigma F_y = 0$$
$$W = constant = L_a + L_w$$
$$L_w = constant - L_a$$

An increased $L_w$ in Fig. 7 further contributes toward a diving tendency. A decreased $L_w$ in Fig. 8 further contributes toward a climbing tendency.

3. Analysis of stability in free flight under a gust condition

A further free flight condition involving an outside disturbance such as a vertical gust may induce a change in the angle of attack without changing the airspeed.

It is supposed that the aircraft encounters an outside disturbance such as a gust which suddenly increases the wing angle of attack without decreasing the speed. With this increase in wing angle of attack, the lift on the wing immediately increases. Since the new lift force is in excess of the value necessary to support the weight of the aircraft, the aircraft accelerates upward. Two stable variations are hereby brought about: (1) An increased lift force located behind the center of gravity and an added downward acceleration force at the center of gravity constitute a force couple which produces a diving moment. (2) An upward vertical velocity brought about by the upward acceleration of the aircraft changes the direction of the air striking the wing in such a way as to decrease the angle of attack of the wing.

Oppositely, stable tendencies may be seen to be brought about by a sudden decrease in angle of attack without an increase in airspeed.

Therefore, the immediate effects of a sudden change in angle of attack without change in airspeed are a stable pitching tendency and a change in angle of attack in the direction of the original angle of attack.

III. EXPLANATION OF MECHANICAL FUNCTIONS

1. Control mechanism

The control mechanism is substantially as shown in Figs. 9, 10, 11, 12 and 18.

Referring to Fig. 10, the control stick 1 is moved in the directions indicated by the arrows pointing up, down, to the left and to the right.

These motions impart the same corresponding control motions to the attitude of the aircraft in flight. For example, an upward motion of the control stick produces a nose-up change in the attitude of the aircraft. A motion of the control stick to the right produces an approximately co-ordinated bank and turn to the right.

In the detailed explanation which follows, certain mechanical changes as described are caused to be brought about by certain motions of the control stick.

For the sake of simplicity, only the left-hand leading and trailing control surfaces will be described in detail. It will suffice to state that up and down motion of the control stick imparts the same motions to corresponding mechanical parts located either to the left or to the right of the aircraft center line, and that left and right motion of the control stick impart opposite motions to these corresponding parts.

Referring to Figs. 10 and 12, the following mechanical changes in the sequence given are brought about by an upward motion of the control stick. The control stick and frame 1 rotates about axis A, moving rod 2 forward and rotating arm 3 about axis C. Cam 4 is mounted on an axis which lies parallel with the major axis of arm 3. About this axis, the cam is free to rotate against the force of spring 154 as illustrated in Fig. 12b which tends to return it to its angular position, as shown in Fig. 12a. As arm 3 rotates about axis C, electrical terminals 8 and 9 on cam 4 connect with resistances 12 and 13, respectively, thereby allowing electrical current to pass from the resistances through the terminals to the D. C. motor 14. Motor 14 which is stationary with the structure of the auxiliary airfoil and the worm gear 15 rotate gear segment 16 and impart a counter-clockwise rotation (as viewed from the left) to shaft 17, causing a change in the relative location of the axis E with respect to the auxiliary airfoil. The rotation of shaft 17 is transmitted through gears 18 and 19 to Selsyn 20. Selsyn 21 is connected to segment 5. Selsyns 20 and 21 are electrically interconnected so that the angular position of shaft 17 is transmitted by Selsyns 20 and 21 to segment 5. Segment 5 rotates until the electrical contact between terminals 8 and 9 and resistances 12 and 13 has been broken, thereby causing D. C. motor 14 to stop.

In a similar manner, an opposite or downward motion of the control stick causes electrical contact to be made between terminals 6 and 7 and resistances 10 and 11, thereby transmitting electrical current of a reverse polarity to motor 14 and causing the motor to move axis E in the opposite direction. Also, as described above, the Selsyns cause segment 5 to follow and overtake the position of arm 3.

In a manner similar to that of the above description, the same upward motion of the control stick also causes rod 22 to rotate arm 24, motor 34, worm gear 35, gear 36 and shaft 37. Selsyns 38 and 39 complete the action as described above. Shaft 37 imparts a clockwise (as viewed from the left) rotation to arm 40. Axis G moves downward and forward, carrying with it beam 41. Beam 41 is suspended at axis G by two rollers 42 and 43. The two rollers are confined to two channels, one on each side of beam 41. As axis G moves downward and forward, beam 41 rotates and rolls forward perpendicularly through axis H, imparting an upward and forward motion to the trailing edge of control surface 44. It may be seen also that a downward motion of the control stick brings about a rearward and downward motion of the trailing edge of control surface 44.

The upward motion of the control stick as described above also moves rod 45 forward. This motion is transmitted through bell crank 46, rod 47, bell crank 48, rod 49, bell crank 50, rod 51 to control surface 52, causing its trailing edge to move upward. In a similar manner, a downward motion of the control stick causes to be brought about a downward motion at the trailing edge of control surface 52.

A vector diagram in Fig. 2 shows resultant aerodynamic forces and their relation to the airfoil of the control surface. The length of arm 151 between axes D and E together with the location of axis D in relation to the airfoil are determined such that the free axis E when rotated about axis D will intersect the $C_{R_a}$ vectors at intervals along its path of motion which are as evenly spaced as possible. These points of intersection are designated on Fig. 2 by the angles of attack corresponding to the vectors. For example, the point of intersection of the axis E and the vector $C_{R_a}$ at $a_a = 12°$ is designated "12°."

Suppose that the axis E whose location relative to the airfoil may be changed by the pilot be given the location shown in Fig. 2. At this location, the resultant aerodynamic force on the airfoil passes through E. Considering this force as the only force acting on the airfoil which is free to rotate about E, the airfoil is seen to be in equilibrium. The angle between its chord line and the direction of air through which it is passing is 12°. The airfoil is free to rotate about axis E and its angular relationship about axis E is dependent only on the air direction.

If the air direction should change, it may be seen from the vector diagram that the airfoil will rotate about axis E to cause its angle of attack of 12° as described above. Now suppose that an upward gust strikes the airfoil and causes its angle of attack to increase momentarily to 16°. At a 16° angle of attack the resultant aerodynamic force is represented in Fig. 2 by $C_{R_a}$ at $a_a = 16$. It may be seen that this force vector passes to the rear of the axis E. This force acting on the airfoil times its perpendicular distance to the axis E is a moment which causes the airfoil to rotate counter-clockwise and reduce its angle of attack to 12°. If the angle of attack should decrease to 8° while axis E remains in its location for a 12° angle of attack, the resultant aerodynamic force may be seen to pass ahead of axis E so as to rotate the airfoil clockwise until its angle of attack is again 12°.

If the angle between arm 151 and the airfoil were increased until axis E coincided with the vector $C_{R_a}$ at $a_a = 16$, the airfoil would be caused to float at 16° as described above.

From the vector analysis of the floating action shown in Fig. 2, it may be seen that for an upward motion of the control stick, and a resulting counterclockwise rotation of the free axis E about axis D, the two control surfaces 54 and 55 located ahead of the center of gravity of the aircraft are caused to float at an increased angle of attack and acquire additional lift force, while the four control surfaces located behind the center of gravity 44, 45, 52 and 53 move toward positions which reduce their lifting force. The combined effect of these changes in lift brought about by an upward movement of the control stick is such as to rotate the aircraft about its lateral axis and cause it to assume an angle of steeper climb. Oppositely, a downward motion of the control stick may be seen to cause the aircraft to dive.

To control the aircraft in the initiation of a normal turn to the right, the control stick is moved to the right as indicated by the arrows in Fig. 10. The control stick and frame 1 rotate about axis B, pushing rod 2 forward and pulling rods 22 and 45 to the rear. The three motions of rods 2, 22 and 45 produce the following three respective motions at axis E, control surface 44 and control surface 52. Axis E moves downward with respect to the airfoil shape of the leading control surface 54; the trailing edge of control surface 44 moves to the rear and downward; the trailing edge of control surface 52 moves downward. It may be seen here that all control surfaces 44, 52 and 54 to the left of the aircraft center line change positions in manners such as to produce additional lift. It may also be seen from the mechanism shown in Fig. 9 that all control surfaces 45, 53 and 55 to the right of the aircraft center line change positions in manners such as to reduce lift. The combined effect of these changes in lift brought about by a movement of the control stick to the right causes the aircraft to roll to the right about its longitudinal axis.

A further effect of the control stick motion to the right is brought about by the negative dihedral angle of control surfaces 52 and 53. (See Fig. 9.) This negative dihedral angle which heretofore has been applied effectively to other designs causes the control surface action of a roll to the right also to produce a yaw to the right. The proportional amount of yaw to roll is governed by the magnitude of the negative dihedral angle. The negative dihedral angle of the outer portions of the wing is therefore designed to produce the combined proportion of yaw and roll desirable in a normal turn.

It is also to be noted here that a positive dihedral angle of the leading control surfaces 54 and 55 serves to produce a similar tendency to yaw in the direction of roll. Here also the magnitude of the designed dihedral angle may be such as to produce more or less yawing tendency with roll.

2. Leading control surface free angular displacement limiting device

The angular displacement of a leading control surface 54 or 55 about its free spanwise axis of suspension varies with the changing direction of the surrounding airstream. In normal flight at any one control position of the free axis with respect to the control surface, the control surface varies throughout a certain normal range of angle of incidence to the structure which attaches the free axis to the main body of the aircraft. At another such control position there is another such normal range of angle of incidence. It is the purpose of the limiting device to limit, for each control position, the normal range of the said angle of incidence to such a range that is necessary for and within which the angular position of the control surface might occur in normal flight.

Referring to Figures 2 and 14, the limiting device consists of a cylinder 152 which is attached to either one of the two axes M and N. To the other one of these two axes is attached a connecting rod and piston 153 which is free to move longitudinally through cylinder 152. By limitation of the relative motion of the piston and cylinder, it may be seen from the figure that the rotation of the control surface about axis E is also limited. Therefore a desirable limitation of the angular motion about the free axis E for a certain control position of arm 151 is accomplished by a certain limitation of the relative linear motion between the piston 153 and cylinder 152.

By properly designing the distances between axes E and M and between D and N, the limited range of the angle of incidence is caused to change with a change in the controlled position of arm 151. This change is such that for each control position, the normal flight range of the angle of incidence will be within the range limited by the device.

3. Leading control surface free angular motion damping device

This device is a means for damping or reducing excessively rapid angular motion about the free axis of suspension of the leading control surfaces. The device consists primarily of piston 153 and cylinder 152. It is provided that a viscous fluid be contained in the cylinder head and that port holes in the piston be provided for the passage of the viscous fluid through the piston.

By this means, the internal friction of the viscous fluid is used to reduce excessively rapid motion of the piston in the cylinder and, by the mechanism explained in (2) above, therefore to reduce excessively rapid angular motion about the free axis E.

4. Control surface retracting mechanism

The control surface retracting mechanism is substantially as shown in Figs. 13, 14, 15, 16, 17 and 18. The position of control surfaces 44, 45, 54 and 55 between the two positions shown in Figs. 13 and 13a is controlled by the pilot by means of electrical toggle switch 59. (See Fig. 14.) The action of the mechanism in moving the control surfaces from their extended position to their retracted position is as follows:

Referring to Fig. 16, the toggle switch 59 is turned to the position indicated "Retract." Direct current flows in conductors 60 and 61 to conductors 64 and 65 on the forward face of insulated disc 63, then through conductors 67 and 68 to D. C. motor 70. Motor 70 turns worm gear 71 and disc 63. Motor 70 also turns gears 72 and 73, shaft 74 and the following parts which are typical of the four retracting jacks: bevel gears 75, 76, 77 and 78, shafts 79 and 80, gears 81, 82, 83, 84 and retracting screws 85 and 86.

The rotation of the retracting screws moves carriage 87 to the rear. Carriage 87 carries with it beam 88 and rollers 89 and 90 which rotate about axis I. The transverse motion of rollers 89 and 90 is confined to two channels in track 91. Connected to beam 88 at axis J is strut 92. As axis I moves to the rear along track 91, axis J and strut 92 rotate about axis K. The leading control surface moves downward and to the rear, and then upward into its retracted position within the airfoil shape of the wing. The lengths of the circular conductor strips on disc 63 are designed in a way such that electrical contact between conductors 61 and 65 will be broken as the control surfaces reach their retracted position. Unthreaded surfaces on screws 85 and 86 (similar in construction to screws 113, 114, 115 and 116 shown in detail in Fig. 18e), and springs similar to springs 121 and 122 are designed to prevent carriage 87 from overriding its limiting positions both at full extension and at full retraction.

To move the leading control surfaces from their retracted positions to their extended positions, the toggle switch 59 is turned to the position marked "Extend." D. C. current flows through conductors 61 and 62, 65 and 66, and 68 and 69, causing D. C. motor 70 and mechanical parts 73 to 92 to operate in a reverse direction and causing leading control surfaces 54 and 55 to move to their fully extended positions. As they reach their position of full extension, electrical contact between conductors 61 and 62 and conductors 65 and 66 is broken to cause D. C. motor 70 to stop.

It is to be noted here (1) that the retracting action may be stopped and started in any position or reversed in either direction between full extension and full retraction; (2) that the extension-retraction action stops automatically when leading control surfaces 54 and 55 reach their fully retracted or fully extended position; and (3) that at both the limiting extended and at the limiting retracted positions of leading control surfaces 54 and 55, the toggle switch is effective only in causing motion which is in a direction away from these limiting positions.

Disc 63 has two faces, each of which are shown respectively in Figs. 16 and 17. Referring to the rear face in Fig. 17, the above described motion of the disc during retraction causes disc 63 and cam 100 to come in contact with one another and to make an electrical connection respectively between terminals 101 and 102 and resistances 105 and 106, allowing current to flow to D. C. motor 105. D. C. motor 105 turns shaft 106 (Fig. 18) and gears 107, 108, 109, 110, 111 and 112. Screw shafts 113, 114, 115 and 116 rotate in unison and carry respective keyed fittings 117, 118, 119 and 120 toward the inner extremities of frame 1. The mechanism is designed so that fittings 117 to 120 will reach their respective ends of threaded portions of shafts 113 to 116 at approximately the same time that the leading control surfaces reach their retracted positions. The unthreaded portions of shafts 113 to 116 are designed to prevent fittings from overriding their limiting positions. Springs 121 and 122 which are typical of springs located at both ends of shafts 113 to 116, serve a designed purpose of starting the fittings 117 to 120 onto the threaded portions of shafts 113 to 116 when their rotation is in a direction to cause the fittings to move away from their limiting positions.

Fig. 18 and Fig. 14 show the fittings 117 to 120 in positions corresponding to the extended positions of leading control surfaces 54 and 55. Fig. 15 shows the mechanism with these fittings in positions corresponding to retracted positions of leading control surfaces 54 and 55. In the latter positions, rods 2, 122, 121 and 22 pass approximately through the intersection of axes A and B. Therefore all control stick motion is ineffective in producing motion at any of the four retracted control surfaces 44, 45, 54 and 55. With this configuration of the control system, control of the aircraft is maintained by means of the outboard trailing control surfaces 52 and 53 whose allied mechanisms remain unchanged by the retracting action.

Referring to Fig. 17, motor 105, in addition to providing rotation of shaft 106, rotates Selsyn 126 through a reduction gearing 124. Connected to the axis of Selsyn 127 is arm 128 upon which cam 100 is suspended free to rotate about an axis which lies parallel with the major axis of arm 128.

A spring such as spring 154 in Figures 12a and b tends to return cam 100 to an angular position such as the one shown in Fig. 12a. The angular motion of gear 125 is transmitted through Selsyns 126 and 127 to arm 128, thus causing cam 100 to overtake its original position relative to disc 63. The relative angular displacement between disc 63 and cam 100 is determined by the relative movement between motors 70 and 105. This relative angular displacement regulates the flow of current to motor 105. Therefore, with the mechanism as shown, the retraction motion of the control surfaces is synchronized with the motion of fittings 117 to 120 with respect to the control frame 1.

The relative sizes and positions of the allied parts of the retracting and control mechanisms, particularly the positions of Selsyns 21, 130, 131 and 39 with respect to the control frame 1, are designed so that the following conditions will hold true during the extension-retraction motion of the control surfaces: (1) Control effectiveness will increase from zero at the configuration shown in Fig. 13a to a maximum degree at the configuration shown in Fig. 13. (2) As the auxiliary control surfaces 54 and 55 are at or near their retracted positions, the position of axis E relative to the airfoil of either control surface is such that the control surface will trail in the airstream with a small downward (away from the wing) aerodynamic force. At the same time, the trailing control surfaces 44 and 45 will be in positions causing them also to produce downward aerodynamic forces. It is an object of the design of the control system to cause the leading and trailing airfoils to be inclined in the airstream at angles such that their pitching moments produced by their downward aerodynamic forces will approximately nullify one another. As the leading and trailing control surfaces move further in the direction of extension, these two downward forces diminish and are replaced by increasing upward aerodynamic forces. At the fully extended positions of the leading and trailing control surfaces, their respective moment effects in pitch are designed to a desirable degree to nullify one another. A discrepancy in the balance of those moments would give the aircraft a tendency to climb or dive. This tendency may be overcome either by an intentional movement of the control stick or by a manipulation of a trimming device which is explained in the following paragraph.

5. *Aircraft vertical attitude trimming device*

The trimming device herein described is designed to enable the pilot to trim the vertical attitude of the aircraft and thereby to reduce persistent control pressures and to preserve a maximum of up and down control movement from the control position at horizontal flight. This device is designed to be effective in regulating trim at either the extended or the retracted configurations of the control system.

The adjustment of trim is accomplished manually by means of hand crank 140. (See Fig. 21.) The hand crank is pulled forward and sideward to release it from retaining hook 141. Spring 142 rotates structure 143 about axis L and forces bevel gear 144 and idler gear 145 to the rear, compressing spring 146. This action slides bevel gear 107 to the rear, as indicated in Fig. 19 by arrows, along its keyed shaft, disengaging it from gears 108 and 109, and engaging gears 145 with gears 108 and 109. A rotation of the hand crank produces rotation of screws 113 and 114 and a movement of fittings 117 and 118. A rotation of the hand crank in one direction causes fittings 117 and 118 to move toward the outer extremities of frame 1 and thereby brings about a change in the position of trailing control surfaces 44 and 45 and their allied mechanical parts to induce a nose-down tendency in the attitude of the aircraft. A rotation of the hand crank in the opposite direction may be seen to induce a nose-up tendency in the attitude of the aircraft. When the desired trim adjustment has been made, the hand crank is pulled forward and engaged with retaining hook 141. This allows spring 146 to re-engage bevel gear 107 with gears 108 and 109, such gear positions being necessary for the normal operation of the extension-retraction mechanism.

What is claimed is:

1. An aerodynamic control device automatically maintaining an angle of attack irrespective of changes in air direction, comprising in combination with a main wing and laterally spaced struts projecting forwardly therefrom, arms pivotally supported for relatively free movement about a lateral axis on the forward ends of said struts, an auxiliary airfoil pivotally supported on a lateral axis on the free ends of said pivotally supported arms, said latter axis extending spanwise through the central portion of the airfoil and remote control means for varying the angular relation between said supporting arms and the airfoil pivotally supported thereby and for maintaining the same in selected angular relations irrespective of said relatively free pivotal movement of the supporting arms on the forward ends of said struts.

2. An aerodynamic control device automatically maintaining an angle of attack irrespective of changes in air direction, comprising in combination with a main wing and laterally spaced struts projecting forwardly therefrom, arms pivotally supported for relatively free movement about a lateral axis on the forward ends of said struts, an auxiliary airfoil pivotally supported on a lateral axis on the free ends of said pivotally supported arms, said latter axis extending spanwise through the central portion of the airfoil and remote control means for varying the angular relation between said supporting arms and the airfoil pivotally supported thereby and for maintaining the same in selected angular relations irrespective of said relatively free pivotal movement of the supporting arms on the forward ends of said struts, and damping means carried by at least one of said struts for controlling the relative freedom of motion of said pivotally supported arms and airfoil carried thereby.

3. An aerodynamic control device automatically maintaining an angle of attack irrespective of changes in air direction, comprising in combination with a main wing and laterally spaced struts projecting forwardly therefrom, arms pivotally supported for relatively free movement about a lateral axis on the forward ends of said struts, an auxiliary airfoil pivotally supported on a lateral axis on the free ends of said pivotally supported arms, said latter axis extending spanwise through the central portion of the airfoil and remote control means for varying the angular relation between said supporting arms and the airfoil pivotally supported thereby and for maintaining the same in selected angular relations irrespective of said relatively free pivotal movement of the supporting arms on the forward ends of said struts and means for effecting the forward projection and rearward retraction of said struts with respect to said main wing.

4. An aerodynamic control device automatically maintaining an angle of attack irrespective of changes in air direction, comprising in combination with a main wing and laterally spaced struts projecting forwardly therefrom, arms pivotally supported for relatively free movement about a lateral axis on the forward ends of said struts, an auxiliary airfoil pivotally supported on a lateral axis on the free ends of said pivotally supported arms, said latter axis extending spanwise through the central portion of the airfoil and remote control means for varying the angular relation between said supporting arms and the airfoil pivotally supported thereby and for maintaining the same in selected angular relations irrespective of said relatively free pivotal movement of the supporting arms on the forward ends of said struts, means for effecting the forward projection and rearward retraction of said struts with respect to said main wing and means for automatically changing the angle of said airfoil with respect to said arms in accordance with the extent of projection and retraction of said struts.

5. An aerodynamic control device automatically maintaining an angle of attack irrespective of changes in air direction, comprising in combination with a main wing and laterally spaced struts projecting forwardly therefrom, arms pivotally supported for relatively free movement about a lateral axis on the forward ends of said struts, an auxiliary airfoil pivotally supported on a lateral axis on the free ends of said pivotally supported arms, said latter axis extending spanwise through the central portion of the airfoil and remote control means for varying the angular relation between said supporting arms and the airfoil pivotally supported thereby and for maintaining the same in selected angular relations irrespective of said relatively free pivotal movement of the supporting arms on the forward ends of said struts, means for effecting the forward projection and rearward retraction of said struts with respect to said main wing and means for automatically changing the angle of said airfoil with respect to said arms in accordance with the extent of projection and retraction of said struts and including leverage connections for rendering said remote control means completely effective when said struts are fully projected and less effective as said struts are retracted.

WILLIAM R. WINSLOW.

REFERENCES CITED

The following references are of record in the file of this patent:

UNITED STATES PATENTS

| Number | Name | Date |
| --- | --- | --- |
| 1,806,379 | Wood | May 19, 1931 |
| 1,837,132 | Page | Dec. 15, 1931 |
| 1,862,902 | McDonnell | June 14, 1932 |
| 2,049,188 | Alfaro | July 28, 1936 |
| 2,156,994 | Lachmann | May 2, 1939 |
| 2,198,893 | Van Vaveren | Apr. 30, 1940 |
| 2,428,194 | Bockrath | Sept. 30, 1947 |